(12) United States Patent
Böttger et al.

(10) Patent No.: US 8,912,105 B2
(45) Date of Patent: Dec. 16, 2014

(54) BULLET PROOF LAMINATE AND TRAUMA PACK

(75) Inventors: Christian Böttger, Remscheid (DE); Achim Fels, Wuppertal (DE); Eckhard Wanscheer, Nordhorn (DE)

(73) Assignees: Propex Operating Company, LLC, Chattanooga, TN (US); Teijin Aramid GmbH, Wuppertal (DE)

( * ) Notice: Subject to any disclaimer, the term of this patent is extended or adjusted under 35 U.S.C. 154(b) by 1593 days.

(21) Appl. No.: 11/993,087

(22) PCT Filed: Jun. 16, 2006

(86) PCT No.: PCT/EP2006/005772
§ 371 (c)(1),
(2), (4) Date: Dec. 19, 2007

(87) PCT Pub. No.: WO2006/136323
PCT Pub. Date: Dec. 28, 2006

(65) Prior Publication Data
US 2010/0218666 A1 Sep. 2, 2010

(30) Foreign Application Priority Data
Jun. 23, 2005 (EP) .................................. 05013518

(51) Int. Cl.
*B32B 5/26* (2006.01)
*F41H 5/04* (2006.01)

(52) U.S. Cl.
CPC .................................. *F41H 5/0485* (2013.01)
USPC ............................ 442/135; 442/183; 442/286

(58) Field of Classification Search
CPC ...... B32B 5/26; B32B 27/32; B32B 2307/54; B32B 2307/514; B32B 27/12; B32B 2262/0215; B32B 2571/02; B32B 5/024; F41H 5/0485
USPC ............... 428/911, 912, 297.1, 297.4, 299.4, 428/299.7, 105, 107; 442/134, 135, 182, 442/184, 185, 186, 286; 2/2.5, 102, 248; 89/36.01, 36.02, 36.05, 901, 918
See application file for complete search history.

(56) References Cited

U.S. PATENT DOCUMENTS

| | | | |
|---|---|---|---|
| 4,989,266 A | 2/1991 | Borgese et al. | |
| 5,302,453 A | 4/1994 | Kouno et al. | |
| 2004/0224592 A1 * | 11/2004 | Cuningham et al. | 442/192 |

FOREIGN PATENT DOCUMENTS

| | | |
|---|---|---|
| DE | 2927653 | 1/1981 |
| DE | 102 37 803 A1 | 3/2004 |
| EP | 1 910 073 | 4/2008 |
| GB | 2234156 | 1/1991 |
| GB | 2286798 | 8/1995 |
| JP | 3178418 A | 8/1991 |
| JP | 8276522 A | 10/1996 |
| JP | 03034934 | 4/2000 |
| JP | 2002522262 A | 7/2002 |
| JP | 2005509757 A | 4/2005 |
| WO | WO 03/089235 | 10/2003 |
| WO | WO 2004/106838 A1 | 12/2004 |
| WO | WO 2005/123369 A1 | 12/2005 |

OTHER PUBLICATIONS

International Search Report, PCT/EP2006/005772, Aug. 25, 2006, 4 pp.
European Search Report, EP 05013518.5, Sep. 23, 2005, 2 pp.
I.M. Ward & P.J. Hine, The science and technology of hot compaction, Polymer, vol. 45, pp. 1413-1427 (2004).
P. Hine & I. Ward, High Strength, High Temperature, Materials World, vol. 6, No. 10, pp. 608-609 (Oct. 1998).
T. Peijs, Composites for Recyclability, Materials Today (Apr. 2003), pp. 30-35.
T. Barany et al. Development and characterization of self-reinforced polypropylene composites, Proc. of the 8th Polymers for Adv. Techs. Int'l. Symposium, Sep. 13-15, 2005.

* cited by examiner

*Primary Examiner* — Arti Singh-Pandey
(74) *Attorney, Agent, or Firm* — Husch Blackwell LLP

(57) ABSTRACT

The invention relates to a trauma pack comprising at least one panel of a plastic material and at least one textile fabric layer affixed to the panel and made of yarns with fibers having a tensile strength of at least 900 MPa, wherein the plastic material of the panel is a self-reinforced thermoplastic material made of filaments, fibers, tapes or strips of a polyolefin polymer, and wherein at least one textile fabric layer is bonded over its entire surface to the self-reinforced thermoplastic material.

13 Claims, No Drawings

BULLET PROOF LAMINATE AND TRAUMA PACK

CROSS REFERENCE TO RELATED APPLICATIONS

This is a National Stage filed under 35 U.S.C. §371 of International Patent Application No. PCT/EP2006/005772 filed Jun. 16, 2006, which designated the United States of America, the disclosure of which is incorporated herein by reference.

The invention relates to a trauma pack comprising at least one panel of a plastic material and at least one textile fabric layer affixed to the panel and made of yarns with fibres having a tensile strength of at least 900 MPa.

GB-A-2 234 156 discloses a trauma attenuation pack for use in flexible body armour that uses a panel of a plastic material. A layer of a ballistic fabric is affixed to at least one side of the plastic panel. The fabric can be affixed to the plastic panel by spot bonding, or preferably by stitching in a spiral pattern. The plastic panel consists preferably of polypropylene. The polypropylene panel with stitched-on ballistic fabric is used in flexible protective clothing in combination with a plurality of layers of ballistic fabrics, the panel being positioned behind the fabric layers, i.e., facing the wearer's body. If the polypropylene panel is provided with a layer of ballistic fabric on one side only, the fabric layer should be facing the wearer's body. The thickness of the polypropylene panel is preferably 1.5 mm, and the fabric is preferably of aramid yarn with a mass per unit area of 300 g/m$^2$.

On impact with protective clothing containing a pack comprising a plurality of layers of ballistic fabric, a bullet does not penetrate the fabric pack but deforms it heavily, resulting in trauma injuries to the wearer of the protective clothing. The plastic-material panel with affixed ballistic fabric layer disclosed in GB-A-2 234 156 is said to reduce this trauma effect.

The object of the present invention is therefore to provide a trauma pack of the type initially described that allows further reduction of the trauma effect.

This object is achieved by a trauma pack comprising at least one panel of a plastic material and at least one textile fabric layer affixed to the panel and consisting of yarns with fibres having a tensile strength at least 900 MPa, wherein the plastic material of the panel is a self-reinforced thermoplastic material which consists of a plurality of fabric layers made from filaments, fibres, tapes or strips of a polyolefin polymer, these being in close contact with one another and bonded to one another at elevated temperatures by partial fusion of the polymer and subsequent compression, and wherein at least one textile fabric layer is bonded over its entire surface to the self-reinforced thermoplastic material.

A self-reinforced thermoplastic material of that kind is also named hot compacted, self-reinforced thermoplastic material. It is particularly advantageous if the polyolefin polymer is an oriented polyolefin polymer in which, for example, the filaments, fibres, tapes or strips are present in drawn form.

The polyolefin polymer is chosen from the group comprising polypropylene homopolymer, a copolymer containing mainly polypropylene; or a polyethylene homopolymer, a copolymer containing mainly polyethylene; or mixtures thereof.

The textile fabric is bonded over its entire surface to the self-reinforced thermoplastic material, preferably by lamination, whereby the textile fabric can also be laminated onto the self-reinforced thermoplastic material by means of a thermoplastic film. It is particularly advantageous if the lamination of the textile fabric onto the self-reinforced thermoplastic material is integrated into the manufacturing process for the self-reinforced thermoplastic material, thus achieving efficient production of the trauma pack in a single process step. Moreover, the textile fabric that is bonded over its entire surface to the self-reinforced thermoplastic material can be provided with an additional panel of a self-reinforced thermoplastic material. For example, a layer of a textile fabric can be positioned between the layers of the thermoplastic material before lamination and be bonded over its entire surface on both sides to the plastic material in a single operation.

The fibres having a tensile strength of at least 900 MPa, determined as specified in ASTM D-885, are preferably fibres made from aramid, polyethylene of ultrahigh molecular weight, polypropylene of ultrahigh molecular weight, polyvinyl alcohol, polyacrylonitrile, polybenzoxazole, polybenzothiazole or glass fibres, the preferred fibres being aramid fibres, particularly those made from poly(p-phenylene terephthalamide), as for example sold under the trade name TWARON® by the company Teijin Twaron GmbH. Yarns of these fibres are processed into textile fabrics, these being preferably in the form of woven fabrics for the present invention.

The self-reinforced thermoplastic material preferably has a diagonal elongation of 5 to 15%, most preferably 8 to 11%.

Furthermore, the trauma pack can be inserted into or placed behind a pack comprising a plurality of layers made of yarns with fibres having a tensile strength of at least 900 MPa.

The trauma pack of the invention can be used to produce items of body armour such as shin guards, and is particularly suitable for use in bullet-proof vests.

A self-reinforced thermoplastic material made from oriented thermoplastic fibres is available under the trade name Curv® from Propex Fabrics GmbH. It has been shown, however, that this commercially available product is still inadequate for the purposes of the present invention.

The invention will now be described in detail with the help of examples.

The trauma effect was investigated in the following examples, in which prior-art trauma packs and those of the present invention were placed behind a pack of 24 layers of TWARON® CT 709 (930 dtex f1000, plain weave, 10.5 per cm in warp and weft, mass per unit area 200 g/m$^2$). In those cases in the examples where a textile fabric made from yarns of fibres having a tensile strength of at least 900 MPa was bonded to the plastic material, the trauma pack was placed behind the pack of 24 layers of TWARON® CT 709 in such a way that the textile fabric faced the wearer's body, i.e., away from the direction of impact. In Example 2, a layer of TWARON® T 751 (3360 dtex f2000, plain weave, 4.5 per cm in warp and weft, mass per unit area 300 g/m$^2$) was used as the textile fabric bonded to the plastic material. In Examples 3, 5, 6, 7 and 9, the fabric used was the above mentioned TWARON® CT 707 (930 dtex f1000, plain weave, 8.5 per cm in warp and weft, mass per unit area 160 g/m$^2$).

EXAMPLE 1

Comparative Example

In this example, 24 layers of TWARON® CT 709 without an additional trauma pack were tested in the ballistic test described below.

EXAMPLE 2

Comparative Example

A trauma pack consisting of a 1.5 mm thick polypropylene panel with TWARON® T 751 fabric stitched in a spiral pattern onto one side was placed behind the pack of 24 layers of TWARON® CT 709 in accordance with the preferred embodiment of GB-A-2 234 156. The trauma pack was positioned in such a way that the stitched-on fabric layer faced away from the direction of impact.

EXAMPLE 3

Comparative Example

In contrast to Example 2, the trauma pack consisted of two polypropylene panels, each of thickness 0.75 mm, a single fabric layer of TWARON® CT 707 being stitched in a spiral pattern onto each panel.

EXAMPLE 4

Comparative Example

The trauma pack consisted of two plastic panels of the self-reinforced thermoplastic material commercially available under the trade name Curv®, consisting of fabric layers of polypropylene tapes compacted together. Each plastic panel had a thickness of 0.6 mm.

EXAMPLE 5

This example used two plastic panels made from compacted fabric layers of oriented polypropylene tapes, a layer of TWARON® CT 707 being laminated onto each panel. The thickness of a panel of the self-reinforced plastic material with laminated fabric was 0.85 mm. However, instead of using the material commercially available under the trade name Curv® that was used in Example 4, the production process for the self-reinforced material of compacted fabric layers of drawn polypropylene tapes was modified for the purposes of the present invention. The lamination of a fabric layer of TWARON® CT 707 onto each panel was integrated into the production process. Four layers of a fabric of drawn polypropylene tapes (Propex fabric 97 9 393 100) were used to produce the trauma pack of the invention. The tapes for this fabric were produced by splitting a polypropylene film. The strips were then drawn and woven into a twill. The fabric layers, a polypropylene film of thickness 50 μm and a layer of TWARON® CT 707 fabric were then simultaneously compacted in a static press (POLYSTAT 400S from the company Schwabenthan) that had been preheated to 180° C. The compacting pressure was 18.8 bar. The superposed layers were maintained at this pressure and temperature for 25 minutes. This was followed by cooling over 15 minutes to a temperature of approx. 40° C. while maintaining the pressure. The compacted material was then removed from the press and cooled in air to room temperature without application of pressure.

The trauma pack was positioned behind the 24 ballistic layers in such away that the laminated fabric layers faced away from the direction of impact.

EXAMPLE 6

Another trauma pack of the invention made from two self-reinforced plastic panels, each of thickness 0.85 mm, made from compacted fabric layers of oriented polypropylene strips, with a layer of TWARON® CT 707 being laminated onto each panel, was tested. This was produced as described for Example 5.

EXAMPLE 7

A trauma pack of Example 6 was placed behind 19 ballistic layers of TWARON® CT 709 fabric such that the fabric layers laminated onto one side of each of the two panels of self-reinforced plastic material faced the direction of impact. Five additional layers of the ballistic fabric were placed behind the trauma pack.

EXAMPLE 8

Comparative Example

From a trauma pack of Example 6 consisting of two panels of self-reinforced polypropylene on to each of which had been laminated a layer of TWARON® CT 707, the previously laminated fabric layers were removed.

EXAMPLE 9

Comparative Example

In this example, a layer of TWARON® CT 707 fabric was again stitched in a spiral pattern onto each of two panels from which the laminated fabric layers had been removed as in Example 8. The trauma pack was placed behind the 24 ballistic layers in such a way that the stitched-on fabric layers faced away from the direction of impact.

Table 1 compares the mechanical properties, as measured in accordance with DIN EN ISO 527-3, of longitudinal and transverse tear resistance, longitudinal and transverse elongation, longitudinal and transverse tensile modulus, and the diagonal elongation for the commercially available product Curv® (Example 4) and the self-reinforced thermoplastic material used in accordance with the invention in Examples 5 and 6, after the previously laminated TWARON® fabric layer has been removed. To determine the diagonal elongation, the test piece was cut in such a way that the polypropylene strips in the test piece were at an angle of 45° to the direction of the load applied for the test. The diagonal elongation indicated in Table 1 represents the mean of 6 individual measurements. Each of the other mechanical properties shown is the mean of 5 individual measurements. The standard deviation is given in each case.

TABLE 1

| | Example 4 | Example 5 | Example 6 |
|---|---|---|---|
| Diagonal elongation [%] | 24.1 ± 6.0 | 9.2 ± 2.4 | 10.2 ± 2.3 |
| Tear resistance (longitudinal) [MPa] | 119.1 ± 8.4 | 128.9 ± 6.3 | 126.6 ± 6.2 |
| Tear resistance (transverse) [MPa] | 113.8 ± 7.1 | 127.8 ± 3.5 | 119.2 ± 5.1 |
| Elongation (longitudinal) [%] | 17.1 ± 1.2 | 20.0 ± 1.7 | 19.1 ± 0.8 |
| Elongation (transverse) [%] | 16.6 ± 1.1 | 19.3 ± 1.0 | 17.3 ± 0.8 |
| Tensile modulus (longitudinal) [GPa] | 3.2 ± 0.1 | 2.5 ± 0.1 | 2.4 ± 0.1 |
| Tensile modulus (transverse) [GPa] | | 2.4 ± 0.1 | 2.4 ± 0.1 |

These data show that the commercial product Curv® has significantly higher diagonal elongation than the self-reinforced thermoplastic material used in the invention. The material used in the invention is also distinguished by higher tear resistance and elongation, but lower tensile modulus, as compared with the commercial product.

In an additional test, the impact strength of the materials was investigated, with measurement of the energy absorbed by the test specimen and of the resulting deformation. The test was performed following ASTM D 5628. For performance of the test, five circular test pieces of area 1 dm² were taken from different parts of the test sample. The test was performed on calibrated Dynatyp 9250 G testing equipment for instrumented impact tests from the company Instrom. A hemisphere of diameter 19.5 mm was used as the impactor. The total weight used was 24.3 kg. The drop weight was released from a height of 0.23 m through a guide tube onto the test piece, which was clamped in a pneumatic holder. The holder had an opening of 40 mm, through which the hemisphere could strike the test specimen. These settings result in a maximum impact energy of 55 joules and a velocity of 2.13 m/s on initial contact of the impactor with the test specimen after activation of the trigger mechanism. The force and energy required to penetrate the test specimen, the time elapsing before failure of the test specimen, and the deformation at failure were determined in the test.

A single layer of the self-reinforced thermoplastic material was used in each of the examples. For the test specimens in Examples 5 and 6, in which the laminated fabric layer was not removed as in Example 8, a maximum impact energy of 104 joules was used. A single layer of the self-reinforcing thermoplastic material with laminated fabric layer was tested, the hemisphere striking the self-reinforced thermoplastic material. The values shown in Table 2 represent the averages of 5 individual measurements.

TABLE 2

|  | Example 4 | Example 8 | Example 5 | Example 6 |
|---|---|---|---|---|
| Impact strength [J] | 6.7 ± 1.9 | 16.4 ± 0.7 | 58.5 ± 18.9 | 77.3 ± 23.7 |
| Deformation [mm] | 7.3 ± 0.8 | 9.3 ± 0.2 | 9.3 ± 0.8 | 10.9 ± 0.5 |

This table shows that the impact strength of the self-reinforced thermoplastic material used in accordance with the invention is, even without a laminated fabric layer, significantly higher than that of the commercially available product.

The deformation caused by a bullet on the side opposite the direction of impact is known to be a measure of trauma. The pack of ballistic fabric layers, with the trauma pack placed behind or between these as applicable, was placed on a layer of Weible plasticine and subjected to ballistic testing. In the examples that follow, the bullet used was a 0.357 Magnum JSP with a bullet velocity of approx. 440 m/s, each pack receiving eight shots. Four of the shots were directed at the outer area of the pack, and the remaining four at the inner area. For each shot, the depth of penetration registered in the plasticine was measured, and from these the mean of the four depths of penetration in the outer region and the mean of the four depths in the inner region were determined.

Table 3 shows the mean values of the penetration depths in the outer and inner regions after the ballistic test for the trauma packs of the above examples, along with the approximate mass per unit area of the packs. The comparative examples are marked with an asterisk in the table.

TABLE 3

| Example | Pack weight [kg/m²] | Trauma, outer region [mm] | Trauma, inner region [mm] |
|---|---|---|---|
| 1* | 4.8 | 35.5 | 37.5 |
| 2* | 6.5 | 34.3 | 31.8 |
| 3* | 6.5 | 31.5 | 25.0 |
| 4* | 5.9 | 36.8 | 26.5 |
| 5 | 6.3 | 26.5 | 17.5 |
| 6 | 6.3 | 26.7 | 14.3 |
| 7 | 6.3 | 25.8 | 21.0 |
| 8* | 5.9 | 28.8 | 22.8 |
| 9* | 6.2 | 28.0 | 22.0 |

The data in Table 3 show that the prior-art trauma pack (Examples 2 and 3), when compared with a pack consisting only of ballistic fabric layers (Example 1), reduces trauma only in the inner region, while for bombardment in the outer region there is almost no improvement. Even two layers of commercially available self-reinforced thermoplastic material (Example 4) effect a reduction of the trauma only in the inner region. In contrast, the thermoplastic material used in accordance with the invention after removal of the initially laminated fabric layer (Example 8) already shows significant reduction of the trauma. This is slightly improved by stitching on a fabric layer in a spiral pattern, as in the prior art (Example 9). However, the trauma packs of the invention of Examples 5, 6 and 7 show the lowest trauma values in both the inner and outer regions.

The invention claimed is:

1. A trauma pack comprising at least one panel of a hot compacted, self-reinforced thermoplastic material and at least one woven textile fabric layer bonded over at least one complete surface to the panel by hot compaction,
    wherein the textile fabric layer comprises yarns with fibres having a tensile strength of at least 900 MPa,
    wherein the panel of hot compacted, self-reinforced thermoplastic material comprises a plurality of fabric layers made from filaments, fibres, tapes or strips of polyolefin polymer,
    wherein the plurality of fabric layers made from filaments, fibres, tapes or strips of polyolefin polymer and the woven textile fabric layer are in close contact with one another and are simultaneously hot compacted and bonded to one another at elevated temperature and pressure.

2. The trauma pack according to claim 1, wherein the polyolefin polymer is an oriented polyolefin polymer.

3. The trauma pack according to claim 1 wherein the polyolefin polymer is selected from the group consisting of a polypropylene homopolymer, a copolymer containing mainly polypropylene, a polyethylene homopolymer, a copolymer containing mainly polyethylene, and mixtures thereof.

4. The trauma pack according to claim 1, further comprising a thermoplastic film situated in between the woven textile fabric and the hot compacted, self-reinforced, thermoplastic material.

5. The trauma pack according to claim 1 comprising at least two panels of a hot compacted, self-reinforced thermoplastic material having at least one woven textile fabric layer bonded over one complete surface of each panel by hot compaction at elevated pressure and temperature.

6. The trauma pack according to claim 1 wherein the fibres of the woven textile fabric layer having a tensile strength of at least 900 MPa are selected from the group consisting of aramid, polyethylene of ultrahigh molecular weight, polypropylene of ultrahigh molecular weight, polyvinyl alcohol, polyacrylonitrile, polybenzoxazole, polybenzothiazole and glass fibres.

7. The trauma pack according to claim 1 wherein the panel of hot compacted, self-reinforced thermoplastic material bonded by hot compaction to the woven textile fabric layer has a diagonal elongation of 5 to 15%.

8. The trauma pack according to claim 1 wherein the pack is inserted behind or between a plurality of layers made of yarns with fibres having a tensile strength of at least 900 MPa.

9. The trauma pack according to claim 1 placed behind a plurality of layers of woven textile fabric made of yarns with fibres having a tensile strength of at least 900 MPa.

10. The use of the trauma pack according to claim 1 for production of items of body armour.

11. The use of the trauma pack according to claim 1 for production of bullet-proof vests.

12. The trauma pack according to claim 1 comprising at least one panel of a hot compacted, self-reinforced thermoplastic material having at least one textile fabric layer bonded over the complete top and bottom surfaces of the panel by hot compaction at elevated pressure and temperature.

13. The trauma pack according to claim 1 comprising more than one panel of a hot compacted, self-reinforced thermoplastic material having at least one textile fabric layer bonded over its entire surface on both sides of each panel by hot compaction at elevated pressure and temperature.

* * * * *